United States Patent
Laymon et al.

(10) Patent No.: US 8,109,162 B2
(45) Date of Patent: Feb. 7, 2012

(54) PIG DETECTOR

(75) Inventors: Matthew S. Laymon, Tulsa, OK (US);
Dwane O. Laymon, Tulsa, OK (US)

(73) Assignee: Enduro Pipeline Services, Tulsa, OK (US)

( * ) Notice: Subject to any disclaimer, the term of this patent is extended or adjusted under 35 U.S.C. 154(b) by 472 days.

(21) Appl. No.: 12/426,553

(22) Filed: Apr. 20, 2009

(65) Prior Publication Data

US 2010/0263460 A1    Oct. 21, 2010

(51) Int. Cl.
*G01M 19/00* (2006.01)
(52) U.S. Cl. ........................ 73/865.8; 116/281
(58) Field of Classification Search ......................... None
See application file for complete search history.

(56) References Cited

U.S. PATENT DOCUMENTS

| | | | | |
|---|---|---|---|---|
| 3,306,251 A * | 2/1967 | Suttie | ............................ | 116/215 |
| 4,491,018 A * | 1/1985 | Stringer et al. | .............. | 73/865.8 |
| 4,658,646 A * | 4/1987 | Bell et al. | ..................... | 73/865.8 |
| 5,263,220 A * | 11/1993 | Campbell | ................ | 15/104.063 |
| 6,357,384 B1 * | 3/2002 | Laymon et al. | ............... | 116/281 |
| 6,823,751 B1 * | 11/2004 | Young | ......................... | 73/865.8 |
| 7,861,665 B2 * | 1/2011 | Rankin | ......................... | 116/303 |
| 2010/0263460 A1 * | 10/2010 | Laymon et al. | .............. | 73/865.8 |

* cited by examiner

*Primary Examiner* — Hezron E Williams
*Assistant Examiner* — Mark A Shabman
(74) *Attorney, Agent, or Firm* — Cornelius P. Dukelow

(57) ABSTRACT

A device for indicating the passage of a pig beyond a predetermined location in a pipeline comprising a pig detector connected to a pipeline and communicating with the interior of the pipeline through an opening at the location. A means for divorcing the pressure inside the pipeline from the pressure outside the pig. A trigger mounted in the pig detector and adapted to project into the interior of the pipeline through the opening, an indicator associated with the pig detector, a cylindrical indicator being slidably mounted within the indicator housing, catch fingers mounted in the housing for movement toward and away from the central axis of the housing, a catch spring for urging the fingers towards the central axis, an indicator spring mounted within the housing for urging the indicator beyond the indicator housing so as to be visible and to provide an indication that a pig has passed.

4 Claims, 7 Drawing Sheets

PIG DETECTOR

CROSS-REFERENCE TO RELATED APPLICATIONS

None.

STATEMENT REGARDING FEDERALLY SPONSORED RESEARCH OR DEVELOPMENT

None.

THE NAMES OF THE PARTIES TO A JOINT RESEARCH AGREEMENT

None.

REFERENCE TO A "SEQUENCE LISTING," A TABLE, OR A COMPUTER PROGRAM LISTING APPENDIX SUBMITTED ON COMPACT DISC AND AN INCORPORATION-BY-REFERENCE OF THE MATERIAL ON THE COMPACT DISC

None.

BACKGROUND OF THE INVENTION

1. Field of the Invention

The present invention relates generally to devices for determining the position of a pipeline pig in a pipeline. More particularly, the present invention relates to an apparatus for signaling the passage of a pipeline pig beyond a predetermined point or points in a pipeline.

2. Description of Related Art

Existing art utilizes a spring to hold a triggering mechanism downward when subjected to the internal pressure of the pipeline when installed. The force the spring is designed to hold is directly dictated by the pressure in the pipeline. Thus, a range of springs are used depending on the anticipated pressure range of the pipeline.

A problem with the existing art is that if the pipeline pressure falls below the anticipated range of the spring in use, the triggering mechanism can remain in the downward position when a pig passes. Conversely, if the pipeline pressure is greater than anticipated, the spring will not be strong enough to hold the triggering mechanism in place against the pressure of the pipeline.

To overcome these problems, the active portions of the triggering mechanism are isolated from the pressure inside the pipeline via o-rings and a bypass port.

BRIEF SUMMARY OF THE INVENTION

The present invention relates to a pig detector that is adapted to be mounted on the outside of a pipeline for the purpose of determining the passage of a pig past the point of attachment. The pig detector includes a pipe nipple connected to the pipeline and communicating with the interior of the pipeline through an opening. A trigger ball projects downwardly from the pipe nipple through the opening and into the interior of the pipeline and adapted to be contacted by a passing pig. The pipe nipple connects with an indicator housing in which a cylindrical indicator is vertically slidably mounted. Within the housing are mounted a plurality of catch fingers which are pivotal towards and away from the central axis of the housing and which are provided with catches. The trigger connects with an actuator which is positioned to bear against the sides of the catch finger to cause them to pivot outwardly away from each other when the actuator moves up vertically. The catch fingers are provided with a garter spring to urge them radially inwardly towards the central axis. The actuator is resiliently urged downwardly by an actuator spring so as to cause the trigger to protrude into the space in the pipeline. An indicator spring is mounted within the housing to resiliently urge the indicator upwardly beyond the indicator housing so as to be visible and to provide indication that a pig has passed by. A lock pin is attached to the lower surface of the indicator and is provided with a pointed end which is adapted, when moved downwardly, to pry the catch fingers apart and also the lock pin is provided with an upper surface adapted to be engaged by the catches on the catch fingers to hold the indicator totally within the housing against the action of the second spring. When a pig moves in the pipeline past the trigger and actuates the trigger, the actuator will bear against the fingers and separate them radially against the action of the garter spring to release the lock pin and allow the indicator to move upwardly within the indicator housing so as to provide a visual indication that a pig has passed.

BRIEF DESCRIPTION OF THE SEVERAL VIEWS OF THE DRAWING

A preferred embodiment of the present invention is described in detail below with reference to the attached drawing figures, wherein.

DETAILED DESCRIPTION OF THE INVENTION

The embodiments discussed herein are merely illustrative of specific manners in which to make and use the invention and are not to be interpreted as limiting the scope of the instant invention.

Figure 1:
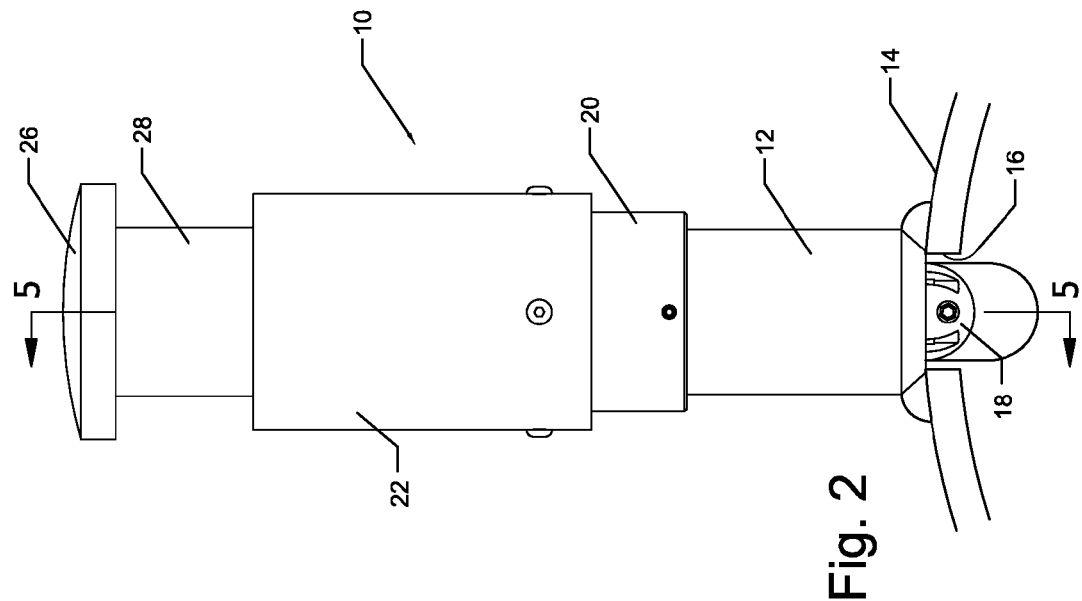
FIG. 1 illustrates an elevation of the pig detector of the present invention showing the trigger element projecting inwardly into the pipeline.
Figure 2:
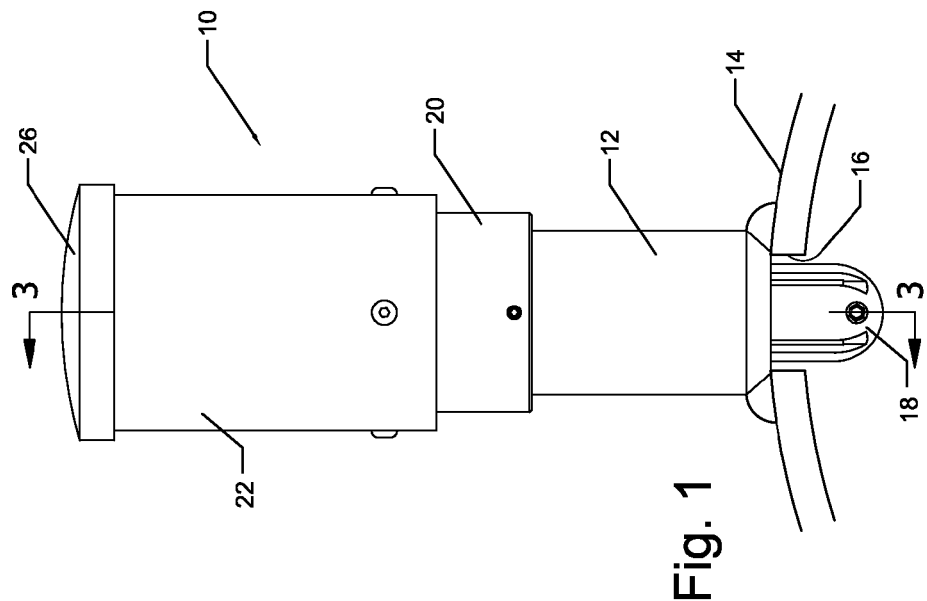
FIG. 2 illustrates a view similar to FIG. 1 but showing the trigger element in its upmost position, with the indicator also being elevated.

Referring to the drawings in detail, FIGS. 1 and 2 show a pig detector 10 comprised of a pipe nipple 12 which can be connected to the outside of a pipe 14 in any conventional manner, for example, by welding. The pipe 14 will have a hole 16 therein through which a ball (trigger) 18 protrudes. The ball 18 is connected to the internal components of the pig detector 10 in a manner later to be described. The exterior of the pig detector 10 also shows a collar 20, an indicator housing 22 and a cap 26.

In the position shown in FIG. 1, the ball 18 is in its lowermost position, indicating that a pig has not passed the location of the pig detector 10 so that the trigger 16 ball is not pushed upwardly. However, in the position shown in FIG. 2, the trigger ball 18 is disposed upwardly indicating that a pig has just passed, such that the internal mechanism has been actuated to release a cylinder 28 which is also referred to as an indicator. In FIG. 2, the indicator 28 merely indicates that a pig has passed by, and it can be very easily distinguished from the appearance of the pig detector in FIG. 1.

Figure 3:
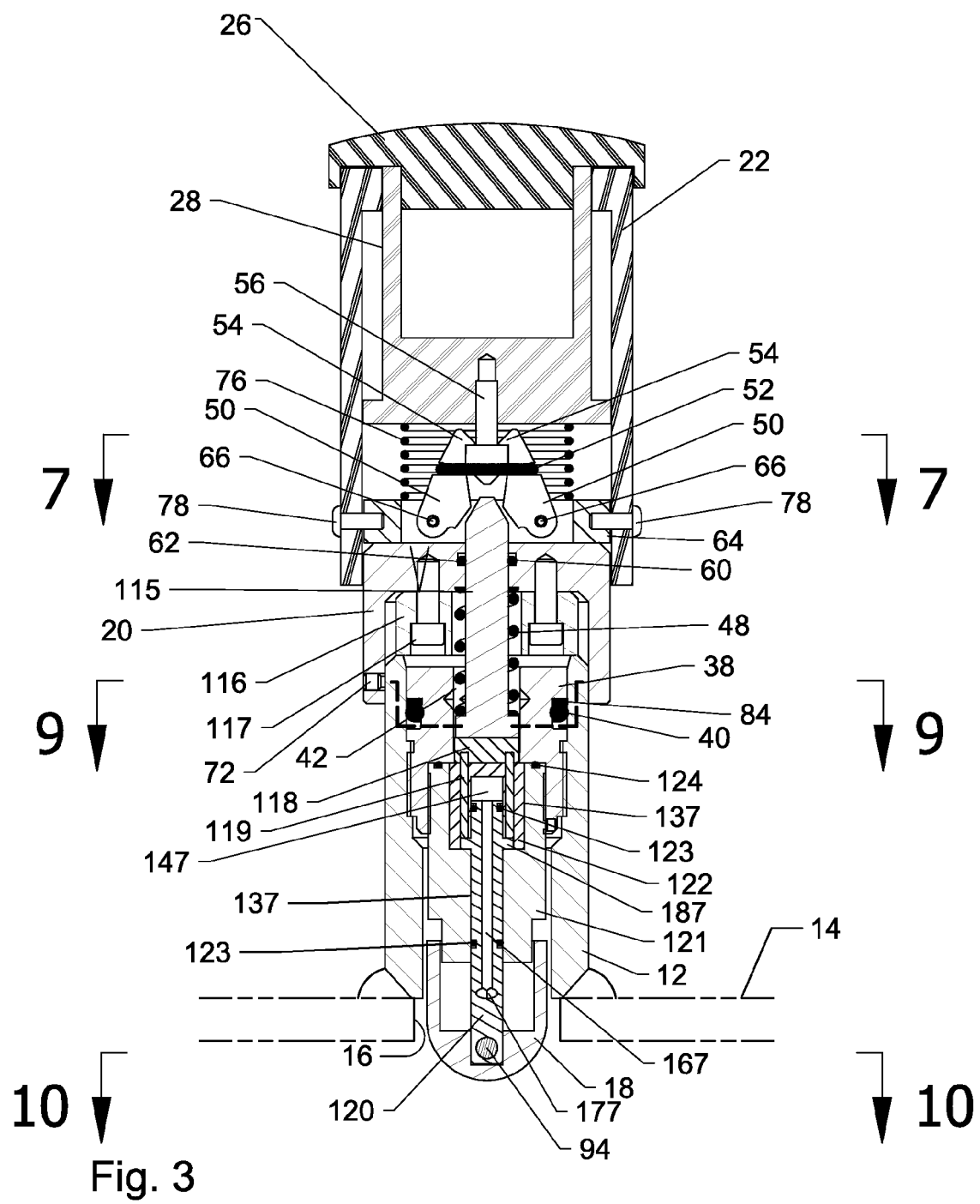
FIG. 3 illustrates a longitudinal sectional view taken along section line 3-3 of FIG. 1.

Referring now to FIG. 3, which is a longitudinal cross-section through the pig detector and the pipe 14, the trigger ball 18 is connected to the lower end of the plunger 120 which connects with an actuator 115 through interconnecting trigger pins 119 and trigger pin plate 118. The plunger 120 is adapted to be slidably received within the lower end of a housing arrangement which has a lower end 121 and an upper end 38. The plunger 120, the trigger plunger cap 122, and the interconnecting trigger pins 119 and trigger pin plate 118 are all slidably received in the lower housing 121 which is interconnected to the upper housing 38 by various threaded means shown in the drawing. The various elements in the drawing located below housing 38 are all variously lubricated and O-rings 40 and 84 are provided. The lower housing is provided with a cylindrical recess 137 in which the plunger 120, trigger plunger cap 122, and interconnecting trigger pins 119 and trigger pin plate 118 are received. The trigger plunger cap 122 is provided with a cylindrical recess 147 in which the upper end of the plunger is received. The trigger plunger cap 122 is maintained in a fixed position when the upper housing 38 is threaded to the lower housing 121. The interconnecting trigger pins 119 and trigger pin plate 118 are maintained in a vertically glidable position by slidably mating the trigger pins 119 with trigger plunger cap holes 157 provided in the trigger plunger cap 122. The trigger pins 119 extend completely through the trigger plunger cap 122 ready to engage the plunger 120 when it is activated by the trigger ball 18. The plunger 120 includes a lip 187 for alternately engaging a step in the lower housing recess 137 and trigger pins 119 depending on whether the trigger ball has been engaged. Two O-rings 123 are mounted in suitable peripheral grooves in the plunger 120: one O-ring to engage and create a seal with the trigger plunger recess 147 and one O-ring to engage and create a seal with the lower housing recess 137. The plunger 120 includes a bypass port 167 running from the top of the plunger to a point just above where the plunger is connected to the trigger ball 18 where the bypass port vents via several vent holes 177 on the periphery of the plunger 120.

An O-ring 124 is mounted in a suitable groove in the top of the lower housing 121 creating a seal with the upper housing 38. An O-ring 40 is mounted in a suitable peripheral groove in the upper housing 38 and a backup O-ring 84 is also mounted in the same groove immediately above the O-ring 40. A helical spring 48 is received over the upper end of the actuator 115 and extends within the recess 42 down-wardly from the lower inside surface of the collar 20 to the lower surface of the actuator 115 for continually urging the trigger pin plate 118 and actuator 115 downwardly so that the ball 18 is also urged downwardly.

Above the top of the actuator 115 there is mounted a plurality of catch fingers 50 which are urged towards each other by means of a garter spring 52. The tops of the fingers 50 are provided with catches 54 which are adapted to be received over the top of a pointed lock pin 56 which is threadedly received in the lower end of a cylindrical indicator 28. The indicator 28 is slidably received within an indicator housing 22.

Figure 6:
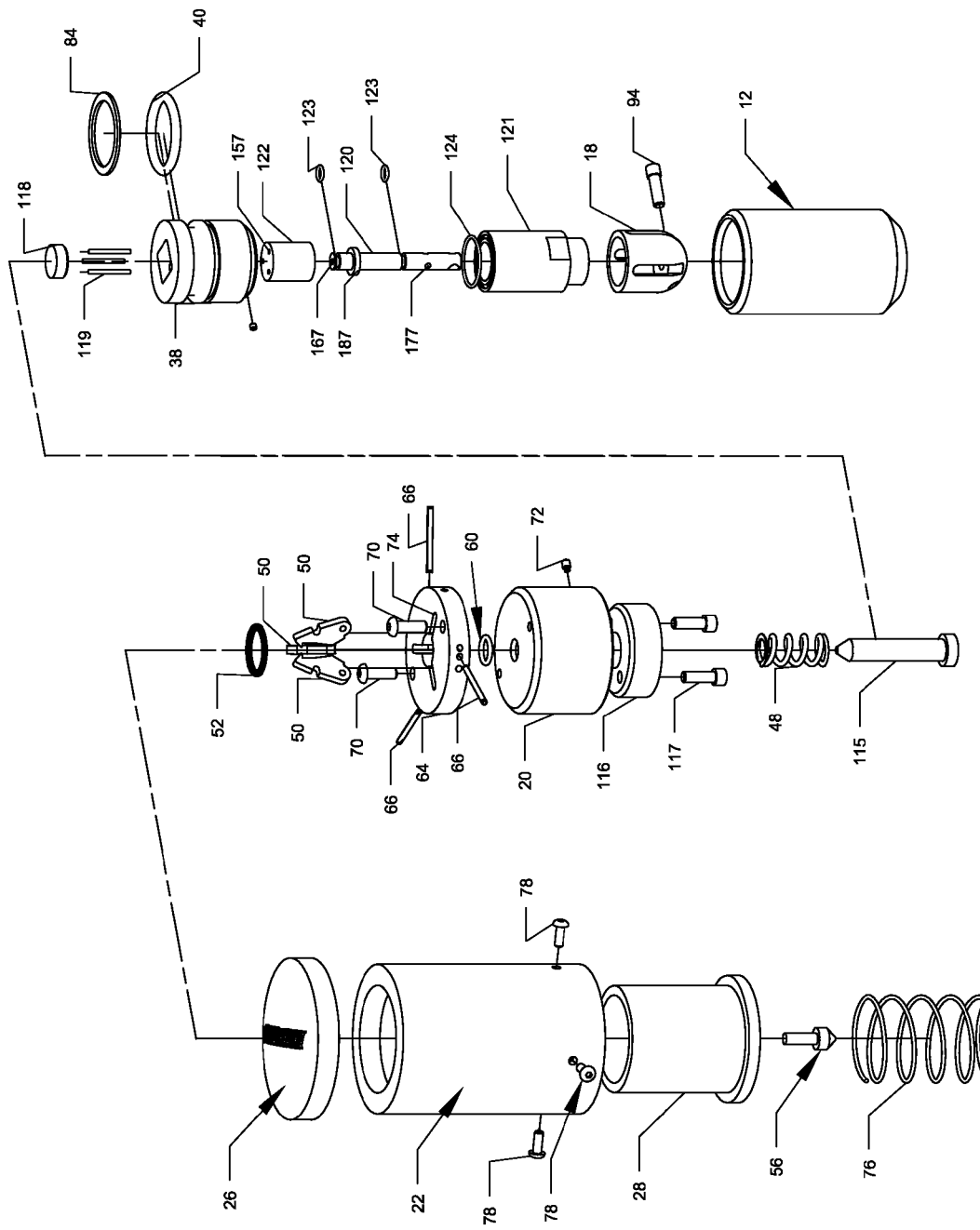
FIG. 6 illustrates an exploded view of the elements shown in FIGS. 1 through 5 but with the catch fingers omitted.

Whereas, most the elements of the pig detector have been shown and described in relation to FIGS. 1 to 3, FIG. 6, nevertheless, is an exploded view which shows the manner in which the various elements interconnect with each other as previously described in relation to FIGS. 1-3; FIG. 6 also illustrates additional elements not specifically shown in FIGS. 1 to 3.

Immediately above the collar 20 there is shown an O-ring 60 which is adapted to be received in a recess 62 located in the upper portion of the collar 20, more particularly centrally in the bore which is provided for the actuator 115. A catch plate 64 is provided for the catch fingers 50. Catch finger pins 66 (three in number) are provided to permit pivoting of the fingers 50 in radial slots 74.

Referring also to FIG. 3, in addition to FIG. 6, the upper end of the pointed lock pin 56 is threadedly received in a threaded opening at the bottom of the indicator 28. Thus, when the lock pin 56 is engaged by the fingers 50, as shown in FIG. 3, the indicator 28 is fully enclosed within the indicator housing 22 and an indicator spring 76 is compressed between the lower end of the indicator 28 and the catch plate 64. Four button-head screws 78 pass through suitable holes in the indicator housing 22 and into the sides of the catch plate 64. The catch plate 64, in turn, is provided with a pair of button-head screws 70 which pass through suitable holes in the catch plate 64 and into holes in the collar 20 to hold them in a fixed position. The collar 20, in turn, is provided with a brass tipped set screw 72 which secures the collar 20 onto the upper threaded end of the pipe nipple 12. Immediately below the collar 20 and directly above the upper housing 38 is a pipe cap spacer 116 held into a fixed position on the underside of the collar 20 by pipe cap spacer bolts 117.

Figure 4:
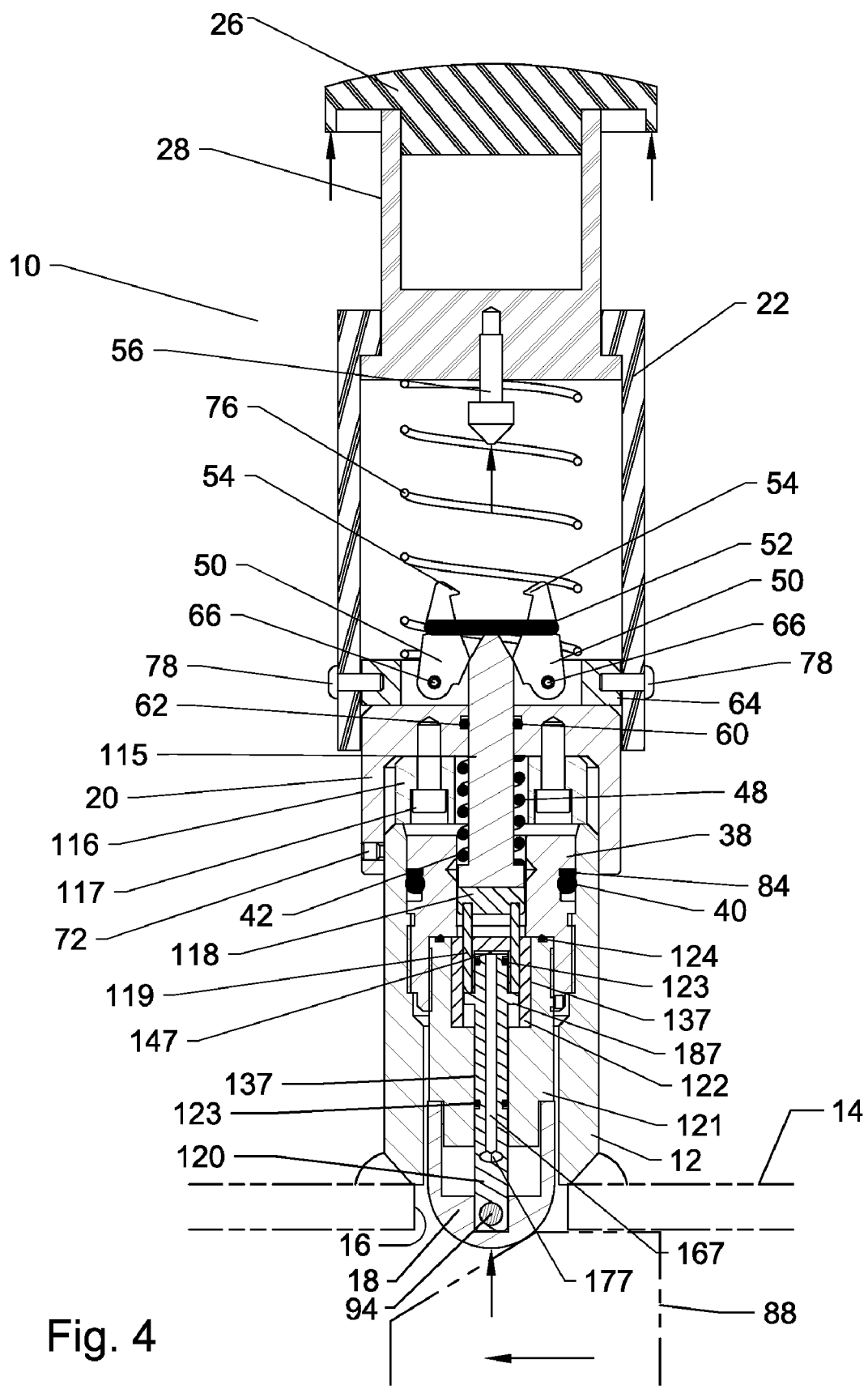
FIG. 4 illustrates a view similar to FIG. 3 but showing the trigger being released by a pig.
Figure 5:
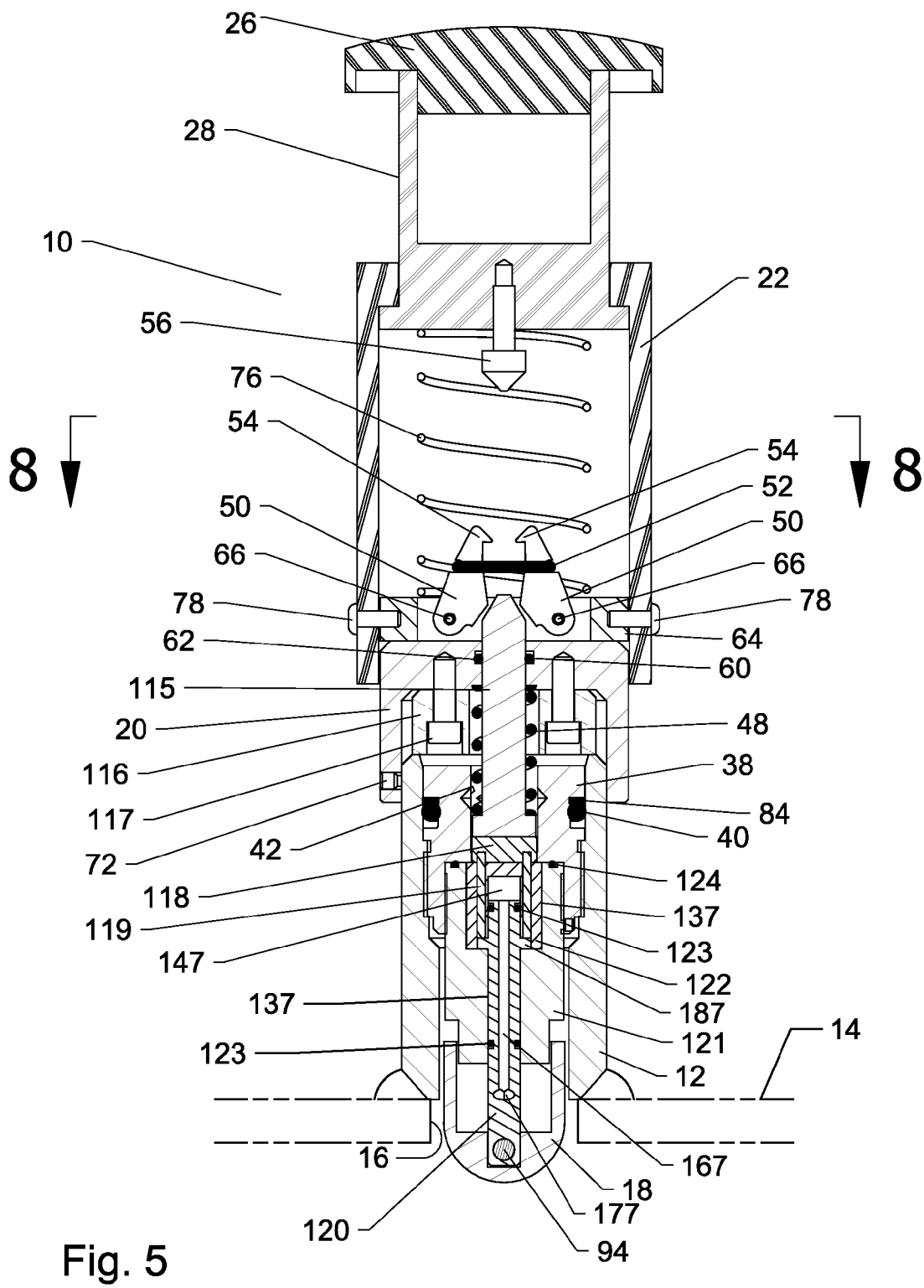
FIG. 5 illustrates a longitudinal sectional view taken along section line 5-5 at a time slightly after the position shown in FIG. 4.

Turning now to FIG. 4, when a pig 88 passes through the pipeline 14 and actuates the trigger 18, the actuator 115 will move upwardly and engage the sides of the three catch fingers 50 causing them to pivot outwardly and release the lock pin 56. At this time, the spring 76 commences to raise the indicator 28. FIG. 5 represents the condition of the pig detector 10 after the pig 88 has passes completely by. In the FIG. 5 position the spring 76 has raised the indicator 28 to its uppermost position so that it serves as a signal to anyone looking that way that the pig has passed this particular pig detector. At the same time, the spring 48 moves the trigger 18 back to its original position and the garter spring 52 will move the fingers 50 back to their original position. If it is desired to recock the pig detector, all one needs to do is push downwardly on the cap 26 until the lock pin 56 is engaged by the catches 54 at the tops of the catch fingers 50.

Figure 7:
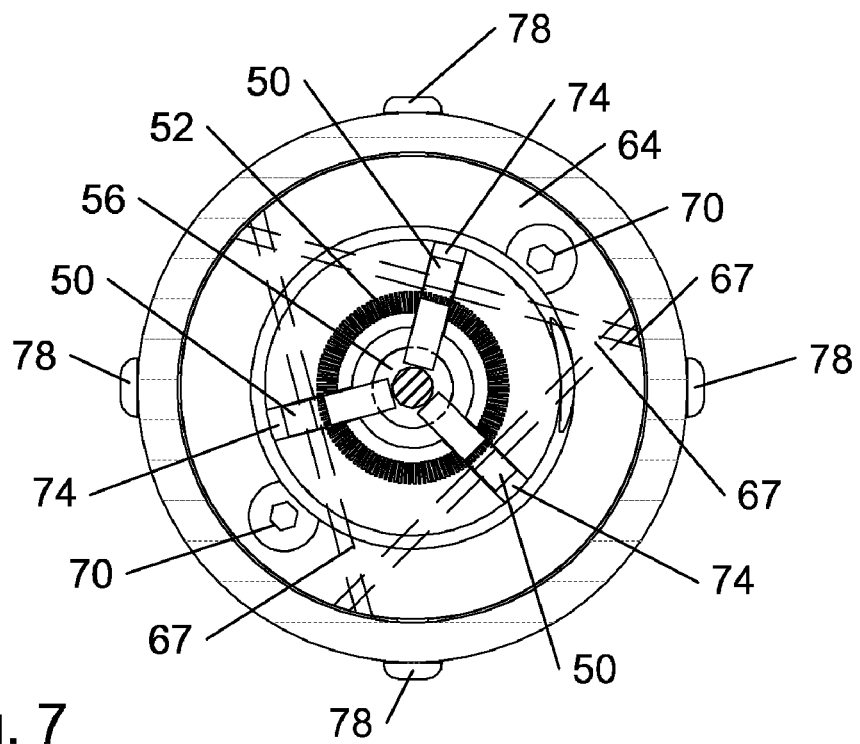
FIG. 7 illustrates a transverse sectional view taken along section line 7-7 of FIG. 3.
Figure 8:
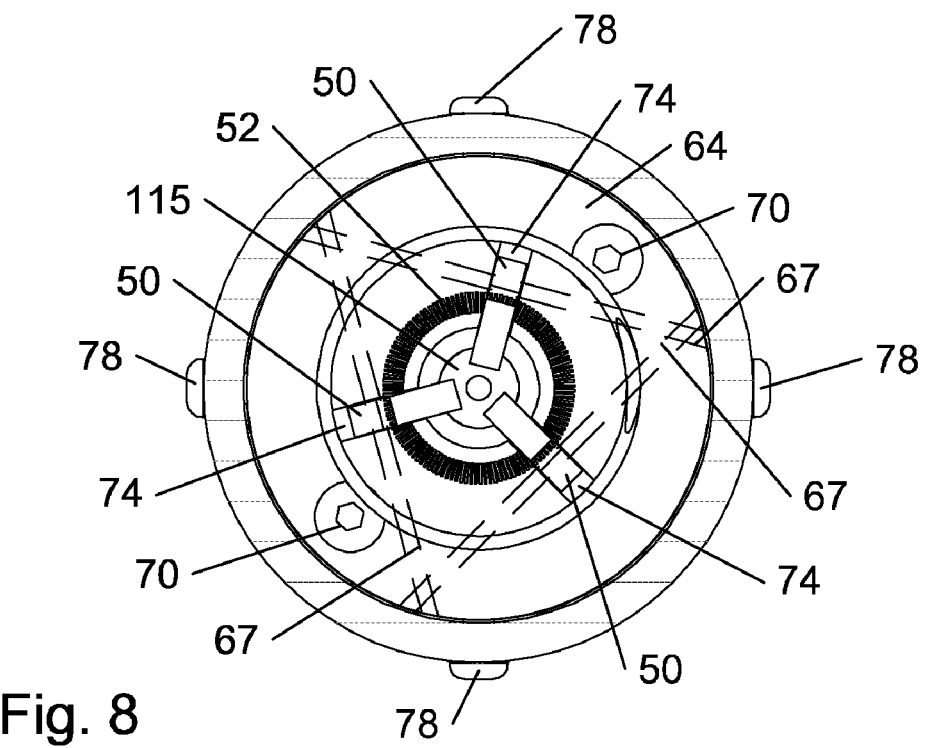
FIG. 8 illustrates a transverse sectional view taken along section line 8-8 of FIG. 5, after the catch fingers have been returned to their original position by the garter spring.

FIGS. 7 and 8 relate to enlarged details of the catch finger assembly. FIG. 7 is a sectional view taken along section line 7-7 of FIG. 3, showing the catch fingers 50 in engagement with the lock pin 56. Note that the fingers 50 are urged pivotally inwardly towards each other by means of the garter spring 52 which encircles the fingers midway of their ends. FIG. 8 is a sectional view taken along section line 8-8 of FIG. 5 after the lock pin 56 has been released. The garter spring 52 has returned the fingers 50 to their original position as shown in FIG. 5 and the actuator 115 is bearing against the lower sides of the fingers. FIGS. 7 and 8 also show three triangularly arranged holes or bores 67 which extend like chords across the catch plate 64 so as to receive therein the catch finger pins 66 which permit, the pivoting of the fingers 50 in the radial slots 74.

Figure 9:
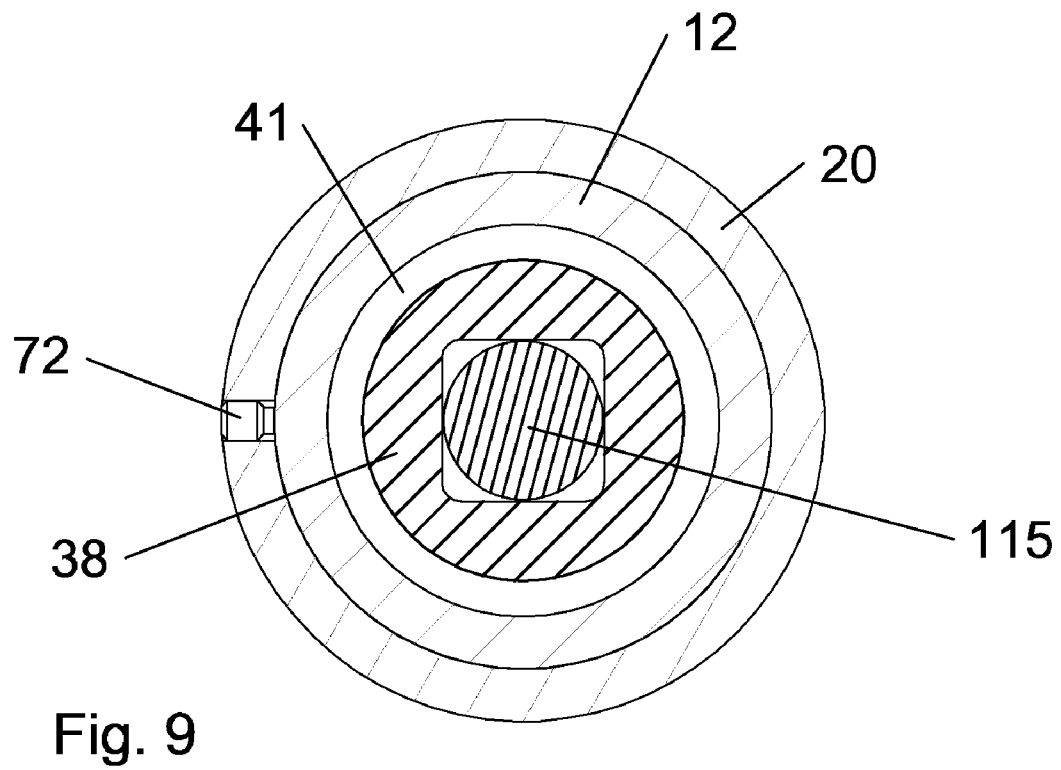
FIG. 9 illustrates a transverse sectional view taken along section line 9-9 of FIG. 3.

FIG. 9 is a transverse sectional view taken along section line 9-9 of FIG. 3 and cuts through the collar 20 roughly in the neighborhood of the set screw 72. Housing 38 is shown separated from the pipe 12 by means of an annular space 41 which represents the recess in which the O-ring 40 and 84 are located.

Figure 10:
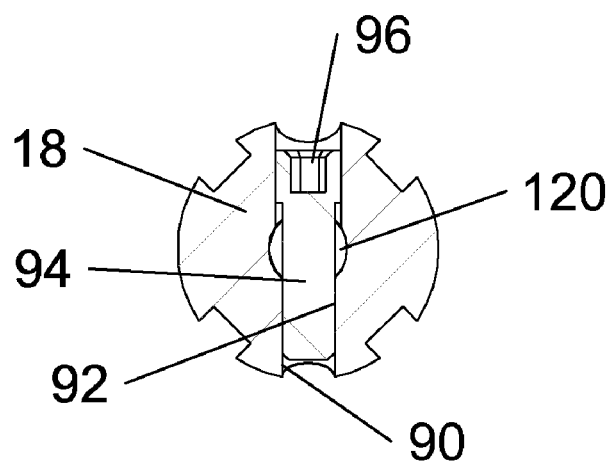
FIG. 10 illustrates a transverse sectional view taken along section line 10-10 of FIG. 3.

FIG. 10 is a sectional view of the bottom end of the trigger 18 showing its attachment to the plunger 120. The trigger 18 is provided with a transverse opening 90 which is in alignment with a transverse opening 92 in the plunger 120. A pin 94 having a set screw 96 at one end thereof is adapted to pass through the opening 90 in the trigger 18 and also through the hole 92 in the plunger 120 to hold the trigger 18 in place.

While the invention has been described with a certain degree of particularity, it is to be noted that modifications may be made in the details of the invention's construction and the arrangement of its components without departing from the spirit and scope of this disclosure. It is understood that the invention is not limited to the embodiments set forth herein for the purposes of exemplification.

The invention claimed is:

1. A device for indicating the passage of a pig beyond a predetermined location in a pipeline comprising a pig detector for connecting to a pipeline and communicating with the interior of the pipeline through an opening at said location, a trigger slidably mounted in the pig detector and adapted to project downwardly into the interior of the pipeline through the opening, an indicator housing associated with the pig detector, a cylindrical indicator being vertically slidably mounted within the indicator housing, a plurality of catch fingers pivotally mounted in the housing for pivotal movement towards and away from the central axis of the housing, means for urging the fingers pivotally towards the central axis, an indicator spring mounted within the housing for resiliently urging the indicator upwardly beyond the indicator housing so as to be visible and to provide an indication that a pig has passed by, a lock pin attached to the lower surface of the indicator, an actuator connected to the trigger and having a portion bearing against the fingers, whereby, when the indicator is pushed downwardly, the lock pin will pry the catch fingers apart and thereafter the catch fingers will engage the lock pin to hold the indicator in a downward position within the indicator housing, a plunger, wherein the plunger comprises a bypass port running through the plunger which vents via at least one vent hole on the periphery of the plunger, whereby, when a pig moves in the pipeline past the trigger and actuates the trigger, the actuator will bear against the fingers and separate them radially against the action of the urging means to release the lock pin and allow the indicator to move upwardly beyond the indicator housing so as to provide a visual indication that a pig has passed by.

2. A pig detector as set forth in claim 1 further comprising a collar through which the actuator extends, an actuator spring extending from the bottom of the collar to a lip on the actuator to urge the trigger downwardly into the pipeline.

3. A device for indicating the passage of a pig beyond a predetermined location in a pipeline comprising a pig detector for connecting to a pipeline and communicating with the interior of the pipeline through an opening at said location,
   a trigger slidably mounted in the pig detector and adapted to project downwardly into the interior of the pipeline through the opening, an indicator housing associated with the pig detector,
   an indicator being vertically slidably mounted within the indicator housing,
   an indicator spring mounted within the housing for resiliently urging the indicator upwardly beyond the indicator housing so as to be visible and to provide an indication that a pig has passed by,
   a locking mechanism attached to the lower surface of the indicator, an actuator connected to the trigger, whereby, when the indicator is pushed downwardly, the locking mechanism will hold the indicator in a downward position within the indicator housing,
   a plunger, wherein the plunger comprises a bypass port running through the plunger which vents via at least one vent hole on the periphery of the plunger, whereby,
   when a pig moves in the pipeline past the trigger and actuates the trigger, the actuator will release the locking mechanism and allow the indicator to move upwardly beyond the indicator housing so as to provide a visual indication that a pig has passed by.

4. A pig detector as set forth in claim 3 further comprising a collar through which the actuator extends, an actuator spring extending from the bottom of the collar to a lip on the actuator to urge the trigger downwardly into the pipeline.

* * * * *